US012665314B2

(12) United States Patent
Pirollo et al.

(10) Patent No.: US 12,665,314 B2
(45) Date of Patent: Jun. 23, 2026

(54) RADIAL LINE SLOT ANTENNA ARRAYS

(71) Applicant: BAE SYSTEMS PLC, London (GB)

(72) Inventors: Bruno Peter Pirollo, Chelmsford (GB); Alexander Harold Sullivan, Chelmsford (GB); Ashley Lloyd Wade, Chelmsford (GB); John Antony Lord, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 227 days.

(21) Appl. No.: 18/699,287

(22) PCT Filed: Oct. 6, 2022

(86) PCT No.: PCT/GB2022/052529
§ 371 (c)(1),
(2) Date: Apr. 7, 2024

(87) PCT Pub. No.: WO2023/057762
PCT Pub. Date: Apr. 13, 2023

(65) Prior Publication Data

US 2024/0429617 A1 Dec. 26, 2024

(30) Foreign Application Priority Data

Oct. 8, 2021 (EP) .................................... 21275147
Oct. 8, 2021 (GB) ..................................... 2114431

(51) Int. Cl.
*H01Q 13/18* (2006.01)
*H01Q 3/24* (2006.01)
*H01Q 21/00* (2006.01)

(52) U.S. Cl.
CPC ............... *H01Q 13/18* (2013.01); *H01Q 3/24* (2013.01); *H01Q 21/0012* (2013.01)

(58) Field of Classification Search
CPC ....... H01Q 13/18; H01Q 3/24; H01Q 21/0012
(Continued)

(56) References Cited

U.S. PATENT DOCUMENTS

2015/0288063 A1 10/2015 Johnson et al.
2018/0219299 A1* 8/2018 Boutayeb ........... H01Q 21/0056
2020/0287283 A1 9/2020 Medhipour et al.

FOREIGN PATENT DOCUMENTS

WO 2023057762 A1 4/2023

OTHER PUBLICATIONS

International Search Report and Written Opinion received for PCT/GB2022/052529. Mailed: Dec. 12, 2022. 17 pages.

(Continued)

*Primary Examiner* — Harry K Liu
(74) *Attorney, Agent, or Firm* — Arcane Law PLLC

(57) ABSTRACT

In some examples, a method for generating a set of slot activation configurations for a holographic radial line slot antenna array comprising multiple slots defining a preconfigured slot pattern, each slot activation configuration defining a beam pattern for a signal to be emitted by the antenna, comprises generating a measure for the mutual coupling between the multiple slots in the presence of a signal to be applied to the antenna, the measure comprising a set of scattering parameters defining a scattering matrix for the antenna, using the measure for the mutual coupling, generating a set of impedance parameters for the array, controlling the resonance of at least one of the multiple slots by regulating a value of capacitance of a variable capacitance device provided across the slot, measuring a value for antenna gain of a beam pattern associated with the value of capacitance, selecting a final value of capacitance resulting in the highest measure of gain for the beam pattern, and selecting a slot activation configuration for the beam pattern on the basis of the selected final value of capacitance.

18 Claims, 4 Drawing Sheets

(58) Field of Classification Search
USPC .......................................................... 342/368
See application file for complete search history.

(56) References Cited

OTHER PUBLICATIONS

GB Search Report under Section 17(5) received for GB Application No. 2114431.6, dated Jul. 4, 2022. 3 pages.
Extended European Search Report received for EP Application No. 21275147.3, dated Mar. 29, 2022. 10 pages.
Molina, et al., "Reactively Matched Long Slot Linear Connected Array Antenna," 2015 9th European Conference on Antennas and Propagation, (EUCAP), Apr. 13, 2015. pp. 1-5.
Takada, et al., "A Scattering Matrix of a Slot Set for the Aperture Illumination Design of Radial Line Slot Antennas," Electronics & Communications in Japan, Part I ,vol. 77, No. 1, Jan. 1, 1994. pp. 46-56.

* cited by examiner

RADIAL LINE SLOT ANTENNA ARRAYS

FIELD

The present invention relates to antenna arrays. Aspects relate to radial slot line antenna arrays.

BACKGROUND

The size, weight, power consumption and cost of implementation of an antenna or antenna array in a platform can be prohibitive, leading to sub-optimal deployments in which, e.g., certain desired functionality may be sacrificed in favour of a lower cost or smaller sized alternative. For example, active electronically scanned antenna arrays (AESA) as well as passive electronically scanned antenna arrays (PESA) are heavy, expensive and require large amounts of electrical power to operate and keep cool. Similarly, passive reflector type antennas are large and not conducive to implementation on certain platforms, such as on modern aircraft for example where (at least) their size can interfere with the aerodynamic profile of the platform.

In order to reduce cost and size, some antenna structures use a single voltage source to drive the elements of the antenna, thereby reducing the physical size of the structure and its implementation cost. However, by using only a single source individual elements cannot be selectively controlled. This therefore limits the use in terms of the emitted beam because, e.g., the array cannot be scanned. Phase shifters can be employed in order to provide a degree of control for an emitted beam, but these are lossy as they are generally ferrite based, thereby leading to inefficiencies. Conversely, a transmitter provided for each antenna element can provide full control of the phase and amplitude of an emitted beam, enabling scanning for example. However, such systems are expensive and generally large as a result of, e.g., the increased real estate required for the driving mechanism. Accordingly, there is often a trade-off between implementing an antenna that is expensive and/or large/heavy but efficient and more controllable, or cheaper and/or smaller/lighter but less efficient and less functionally useful.

SUMMARY

According to a first aspect of the present disclosure, there is provided a method for generating a set of slot activation configurations for a holographic radial line slot antenna array comprising multiple slots defining a preconfigured slot pattern, each slot activation configuration defining a beam pattern for a signal to be emitted by the antenna, the method comprising generating a measure for the mutual coupling between the multiple slots in the presence of a signal to be applied to the antenna, the measure comprising a set of scattering parameters defining a scattering matrix for the antenna, using the measure for the mutual coupling, generating a set of impedance parameters for the array, controlling the resonance of at least one of the multiple slots by regulating a value of capacitance of a variable capacitance device provided across the slot, measuring a value for antenna gain of a beam pattern associated with the value of capacitance, selecting a final value of capacitance resulting in the highest measure of gain for the beam pattern, and selecting a slot activation configuration for the beam pattern on the basis of the selected final value of capacitance.

In an implementation of the first aspect, a set of sub-wavelength slot elements distributed across a slot surface can be dynamically switched 'on' or 'off' in order to generate a reconfigurable antenna, which is low cost, low weight and low profile. In an example, a value for radiated power of the antenna can be measured. A value for power in a direction of peak gain for the antenna can be measured. An updated measure for the mutual coupling between the multiple slots in the presence of the value of capacitance can be generated.

The measure for the mutual coupling can be generated by calculating respective measures of current flowing through resistive elements logically disposed across ports of the multiple slots. Regulating a value of capacitance of a variable capacitance device can comprise adjusting respective values of reactive capacitance for the multiple slots. The set of impedance parameters for the array can be converted to an updated measure for the mutual coupling between the slots in the presence of the value of capacitance. Respective measures for the excitations of the multiple slots can be calculated. The resonance of at least one of the multiple slots can be controlled or varied by regulating or modifying a value of capacitance of a variable capacitance device provided across the slot using one of multiple discrete values for capacitive reactance.

According to a second aspect of the present disclosure, there is provided a non-transitory machine-readable storage medium encoded with instructions for generating a set of slot activation configurations for a holographic radial line slot antenna array comprising multiple slots defining a preconfigured slot pattern, each slot activation configuration defining a beam pattern for a signal to be emitted by the antenna, the instructions executable by a processor of a machine whereby to cause the machine to generate an impedance matrix for the array using a set of scattering parameters for the array, tune a resonant frequency of a slot using a capacitive reactance, whereby to generate an updated impedance matrix for the array, calculate respective measures of current around the multiple slots using the updated impedance matrix, calculate respective measures of voltage across the multiple slots using the measures of current and the impedance matrix, convert the updated impedance matrix to an updated set of scattering parameters, and using the updated set of scattering parameters and the measures of voltage, calculate an radiation pattern for the antenna.

In an implementation of the second aspect, the resonant frequency can be optimised using multiple different combinations of capacitive reactance in order to minimise power reflected from an input port of the array. The resonant frequency can be optimised using multiple different combinations of capacitive reactance in order to minimise power transmitted to an unloaded coaxial port of the array. The resonant frequency can be optimised using multiple different combinations of capacitive reactance in order to maximise power radiated in a selected direction. In an example, a set of slot activation configurations can be generated, each slot activation configuration defining a capacitive reactance for each of the multiple slots for a given beam pattern for the array. The resonant frequency of a slot can be tuned using one of multiple discrete values for the capacitive reactance.

BRIEF DESCRIPTION OF THE FIGURES

Embodiments of the invention will now be described by way of example only with reference to the figures, in which.

DETAILED DESCRIPTION

Figure 1:
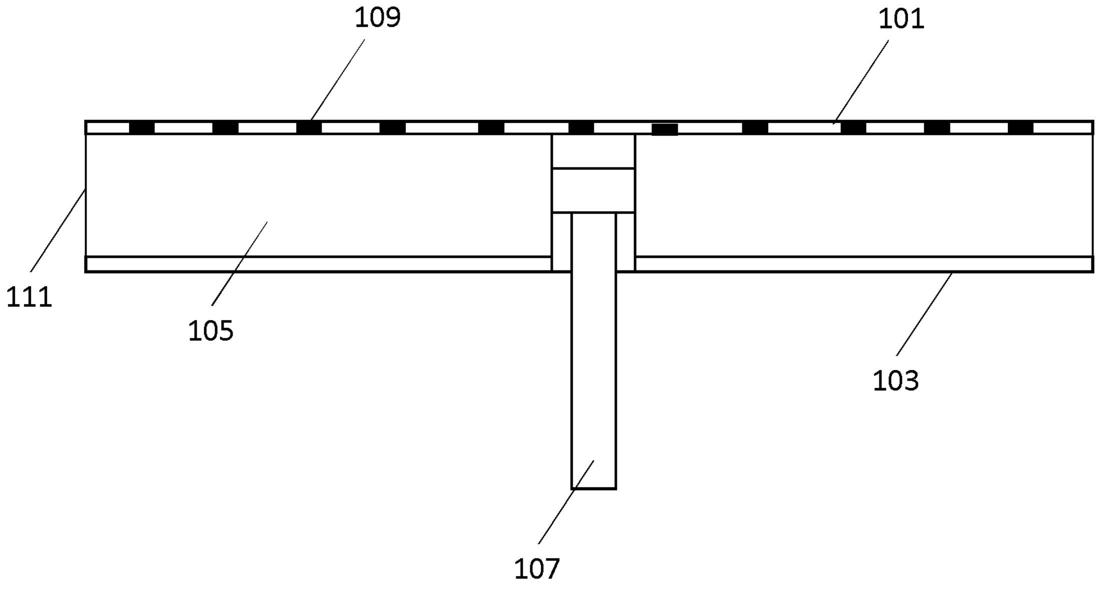
FIG. 1 is a schematic representation of an RLSA array according to an example

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

A radial line slot antenna (RSLA) is a low-cost antenna structure comprising a radiating element, a cavity, a background plate and a feed to supply a signal for the radiating element. The radiating element and the background plate generally comprise a pair of metallic disks, such as aluminium, copper or brass, separated by the cavity and thereby forming a parallel plate waveguide, fed in the centre by the feed, which can be, e.g., a coaxial feed or waveguide transition. The cavity between the parallel plates can be filled with a low permittivity substrate such as a dielectric material, or slow wave structure. This can help to prevent the formation of grating lobes in the far-field pattern. In conjunction with the radiating element and the background plate, the cavity operates as a circular waveguide that guides a signal from the feed so that it propagates in a radial direction.

An RLSA typically comprises multiple through slots or apertures in the radiating element, notionally configured as multiple slot pairs, in which each pair effectively acts as an antenna element for the RLSA such that all of the multiple slot pairs of the radiating element form an array antenna. The slot pairs are arranged in a predetermined pattern that is configured to produce a fixed beam at a given frequency in a given polarisation, and slots of a slot pair are typically arranged relative to one another such that their long axes are orthogonal to one another. The orientation of the slots can be determined by analysing the vector of the field propagated by each slot in the array and it is common to consider the slots of a slot pair as being in phase and out of phase and then using the cumulative sum of these sets of slots to achieve the desired polarisation.

In general, the interactions between antenna elements of an RLSA array as a result of mutual coupling between the small slots make it very difficult to generate a correct amplitude and phase taper across the array for a given beam angle. Accordingly, RLSA arrays, in which slots are fixed in defined locations, and where only the size and position of the slots can be optimised to generate a specific beam shape in a given direction, are not generally considered to be practicable candidates for tuneable antenna arrays and are therefore optimised for one specific beam angle.

FIG. 1 is a schematic representation of an RLSA array according to an example. The RLSA Array comprises a radiating element 101, a cavity 105, a background plate 103 and a coaxial feed 107. Slots 109 are provided in the radiating element 101. Slots 109 form discontinuities in the radiating element. Accordingly, a signal from feed 107 will cause a voltage to develop across the slots. Walls 111 can be a conductive material or left open. There are numerous ways in which slots can be positioned in the radiating element and the methods described herein are agnostic to the overall slot pattern. For example, a two-dimensional spiral slot array can be used.

According to an example, a method for generating a set of slot activation configurations in an RLSA is provided, whereby to enable a desired amplitude and phase taper across the array. As such, a holographic antenna array, in the form of a tuneable RLSA, can be implemented, in which a beam position and frequency of operation can be adjusted to any one of multiple predetermined configurations.

In order to enable an RLSA to be scannable, the slots that go to make up the slot pairs should be small and spaced at a distance from one another that is smaller than the prevailing operating wavelength. For example, for an array with a 300 mm diameter and an operating frequency of ~13 GHz, slots with dimensions of around 4×2 mm can be used. More particularly slots with dimensions of around 4.3×1.5 mm can be used. More particularly, slots with dimensions of 4.35×1.625 mm can be used.

As a result of the slot size, there is scattering in and out of the antenna array. This results in a distorted pattern meaning that the phase of a signal emitted from the antenna may be not be as intended. In general, it is therefore difficult to predict what effect each slot will have.

In order to create a beam pattern, incorporating all antenna parameters of note such as directivity, side lobe level, input match radiated power, an S-parameter matrix (S-matrix) can be generated which accounts for the mutual coupling between all the slots and all the feed ports of the antenna array. In an example, a generated S-matrix can be used to evaluate the array performance at various configurations in which antenna elements (i.e., slot pairs) and/or individual slots are 'on' or 'off'.

According to an example, a measure of current across a resistive element can be calculated from which it is possible to calculate the voltage across a slot for a given input signal. The voltage measure for slots can be used to generate the s-matrix, from which it is possible to generate a z-parameter matrix (z-matrix) comprising the impedance parameters of the array and representing the input and output currents flowing through ports associated with the slots. There will be real and imaginary components of the impedance for each slot. In order to maximise the energy radiated from the array, the imaginary component of the impedance for slots should be zero. That is, to increase the power factor, the imaginary part of the load impedance should be as small as possible, so that the impedance becomes real-valued. In an example, as the slots are sub-wavelength, a capacitance can be added across the ports of a slot in order to tune them so they are resonance. In an example, a reactive capacitance can be used (and tuned) in order to determine the point at which the maximum radiated energy occurs. A z-matrix, defining impedance values for an array that provides such a maximum radiated energy, can be converted back to an s-matrix to enable power values for the array to be determined. This process can be repeated, using various combinations of capacitance values for slots, to determine a set of slot activation configurations that define values for capacitance of slots that results in the maximum radiated energy in the direction and for the polarisation desired. In an example, a genetic algorithm can be used to effectively cycle between various combinations of capacitance value in order to determine the slot activation configurations for beam patterns of interest.

According to an example, given the optimum values for capacitance, slots can be effectively turned on or off. That is, for a given beam pattern to be emitted from the array, a slot activation configuration can be determined, which represents a set of capacitance values for respective slots of the array that result in the maximum radiated energy in the direction and for the polarisation desired. Deviation from these capacitance values will reduce the radiated energy. Accordingly, a set of slot activation configurations can be determined, each of which defines a set of slot capacitance values that enable a beam to be emitted from the array in a desired direction. Thus, according to an example, a holographic array can be implemented in which slot activation configurations enable slots to be effectively turned on or off.

Figure 2:
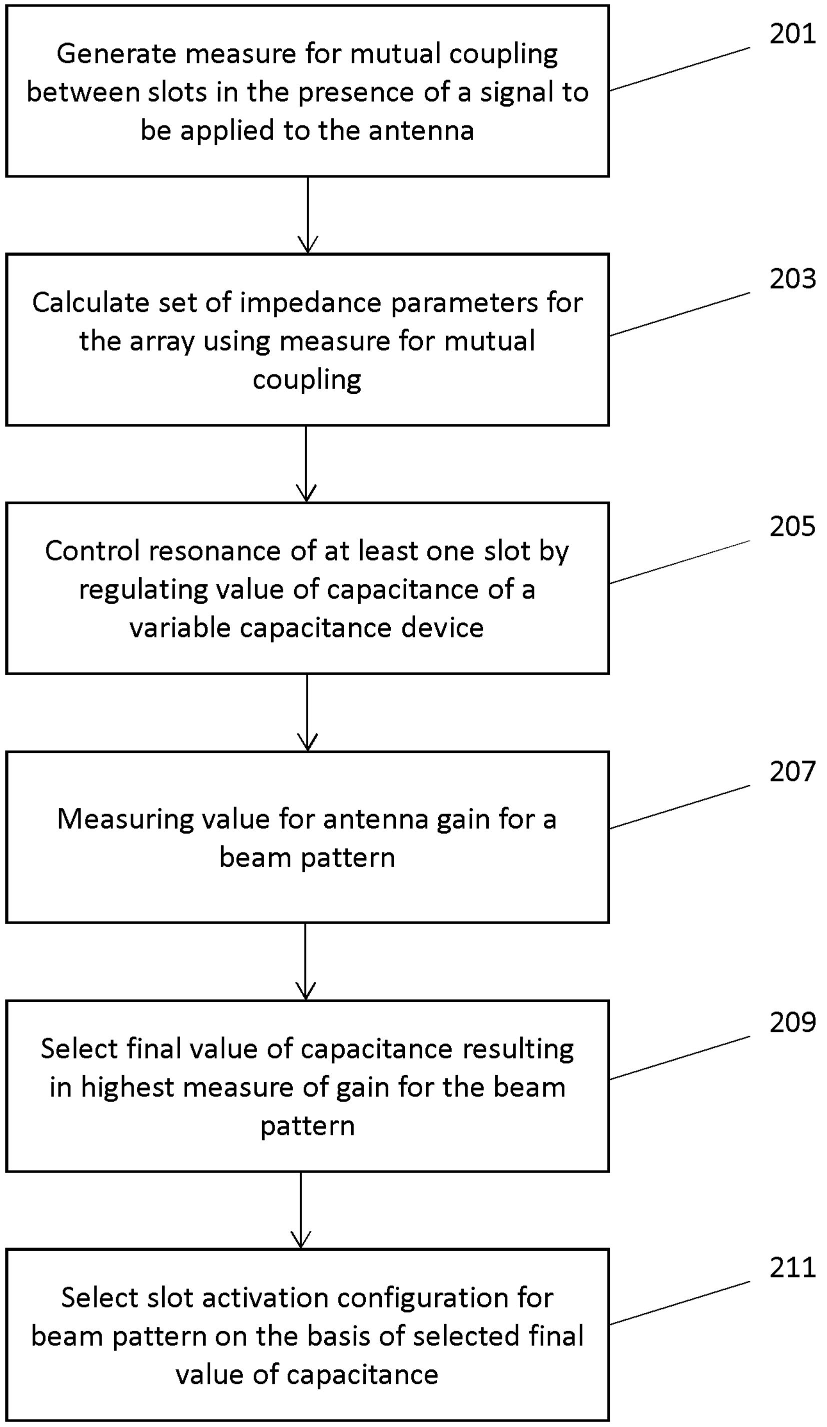
FIG. 2 is a flowchart of a method according to an example.

FIG. 2 is a flowchart of a method for generating a set of slot activation configurations for a holographic RLSA array according to an example. As noted above, the RLSA array comprises multiple slots defining a preconfigured slot pattern, and each slot activation configuration defines a beam pattern for a signal to be emitted by the array. In block 201, a measure for the mutual coupling between the multiple slots in the presence of a signal to be applied to the antenna is generated. In an example, the measure comprises a set of scattering parameters defining a scattering matrix (s-matrix) for the antenna. The scattering matrix can be calculated by considering ports on every slot and every feed of the antenna comprising a resistive element, such as a 50 Ohm resistor for example. The current passing through the resistive element can be calculated to yield the s-parameters for the array thereby enabling a characterisation of the coupling from each port to every other port in the array.

In block 203, the measure for the mutual coupling is used to calculate a set of impedance parameters for the array. The impedance matrix enables a capacitance to be added to the geometry of the array, thereby enabling tuning of the resonant frequency of slots. The z-parameters of the z-matrix are related, in general, to its s-parameters by:

$$Z = \sqrt{z}(1_N - S)^{-1}(1_N + S)\sqrt{z}$$

Where $1_N$ is the identity matrix, and $\sqrt{z}$ is a diagonal matrix having the square root of the characteristic impedance at each port as its non-zero elements.

In block 205, the resonance of at least one of the multiple slots is controlled or varied by regulating or selecting a value of capacitance of a variable capacitance device, such as a varactor diode for example, provided across the slot. That is, the resonant frequency of slots is tuned by varying a capacitance of the slots, measuring a value for antenna gain for a beam pattern (block 207), and selecting a final value of capacitance resulting in the highest measure of gain for the beam pattern (block 209). Since the beam pattern for the array will vary depending on the state of activity of the slots, various beam patterns can be generated by cycling through various combination of capacitance for a slot or slots in order to vary the degree to which they are in resonance.

In block 211, a slot activation configuration for the beam pattern is selected on the basis of the selected final value of capacitance. That is, given a desired beam pattern for the array, a slot activation configuration defines a set of slots to be switched on or off (or be in a semi-active state of emission). The state of emission of a slot is dictated, in an example, by the capacitive reactance for the slot in question. Such a value can be selected to effectively prevent a slot from being in a state in which it is radiating, in a state in which it is radiating at a maximum value, or somewhere in between these extremes. Accordingly, in tuning the resonant frequency of slots, the value for antenna gain for a given combination of capacitance values associated with slots of the array gives rise to a beam pattern due to the couplings between the slots in their various states of activity. By cycling through various combinations of capacitance for slots of the array, using a genetic algorithm for example, a set of configurations can be built up, each of which maps to a given beam pattern, some of which will be of interest, others of which may not. Thus, by varying the capacitance of slots, in order to modify their state (e.g., on, off, semi active and so on), a picture can be built up of the configurations that result in desirable or desired beam patterns.

According to an example, a slot can be switched on or off, or provided in a semi-active state, by applying a capacitance selected from one of multiple values, which may be discrete values for example. Accordingly, a desired beam pattern to be emitted by the array may relate to a slot activation configuration in which a proportion of the slots are radiating at a first level, a proportion of the slots are radiating at a second level and so on. The first level can correspond to a slot being, effectively, off, whilst the second level can correspond to a slot being, effectively, on and radiating at or close to resonance. In between these states, various other levels of slot activity can be provided in which slots are radiating below resonance but are not 'off', depending on the prevailing value of capacitance for a slot or slots.

The present disclosure is described with reference to flow charts and/or block diagrams of the method, devices, apparatus and systems according to examples of the present disclosure. Although flow diagrams described may show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a machine such as a general-purpose computer, user equipment such as a smart device, e.g., a smart phone, a special purpose computer, an embedded processor or processors of other programmable data processing devices to realize the functions described in the description and diagrams. In particular, a processor or processing apparatus may execute the machine-readable instructions. Thus, modules of apparatus (for example, a module implementing a converter to convert an s-matrix to a z-matrix and vice versa) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 3:
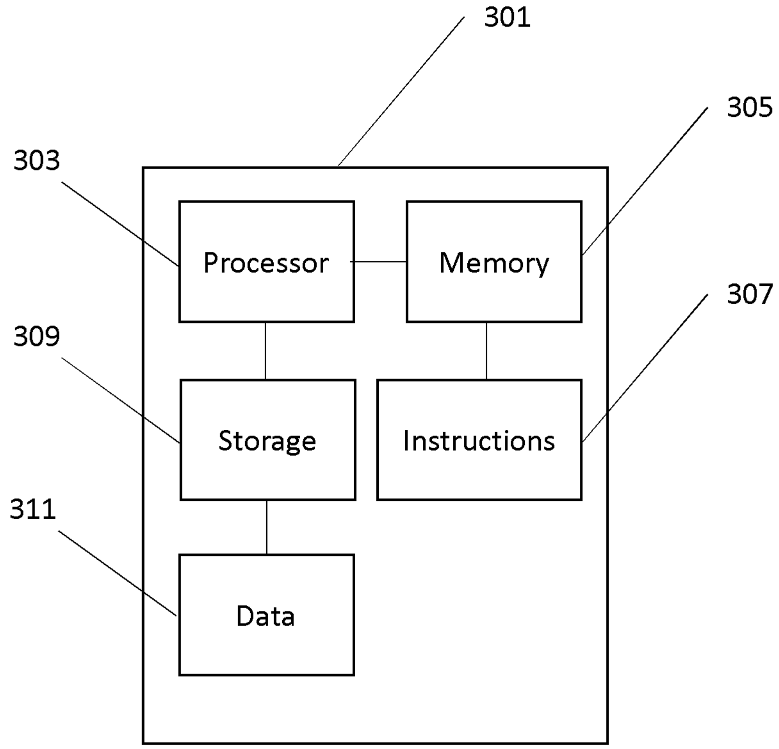
FIG. 3 is a schematic representation of a machine according to an example.

FIG. 3 is a schematic representation of a machine according to an example. In the example of FIG. 3, the machine 301 comprises a processor 303, and a memory 305 to store instructions 307, executable by the processor 303. A storage 309 that can be used to store data 311 representing any one or more of a set of slot activation configurations, s-parameters and/or matrices, z-parameters and/or matrices, and capacitance values. The instructions 307, executable by the processor 303, can cause the machine to generate an impedance matrix for the array using a set of scattering parameters for the array, tune a resonant frequency of a slot using a capacitive reactance, whereby to generate an updated impedance matrix for the array, calculate respective measures of current around the multiple slots using the updated impedance matrix, calculate respective measures of voltage across the multiple slots using the measures of current and the impedance matrix, convert the updated impedance matrix to an updated set of scattering parameters, and using the updated set of scattering parameters and the measures of voltage, calculate an radiation pattern for the antenna.

According to an example, a measure for the mutual coupling between slots of the array comprises an s-matrix characterising the geometry of the array. The s-matrix can be generated by applying a port at every point in the array geometry of interested, in which a port can comprise a resistor at which voltage and current can be measured. An s-matrix calculated for an array can be converted to the impedance matrix (z-matrix) as noted above. Given the impedance matrix [Z], a capacitive reactance can be applied to each slot to provide a loaded impedance matrix [$Z_{loaded}$], such that:

$$[Z_{loaded}] = [Z] + [1_N] \cdot [C]$$

where [C] is a 1D array of (capacitive) reactances given by:

$$[C] = \begin{bmatrix} -1/(2\pi f C_1) \\ \dots \\ -1/(2\pi f C_n) \end{bmatrix}$$

There is therefore a new impedance matrix which has the capacitances added into it, such that:

$$[Z_{loaded}] = [Z] + [E] \begin{bmatrix} -1/(2\pi f C_1) \\ \dots \\ -1/(2\pi f C_n) \end{bmatrix}$$

The new Z matrix ([$Z_{loaded}$]) can be converted to an S-Parameter matrix to enable the S-parameters of unloaded coaxial ports of the array to be examined, and/or to enable calculations of the excitations [$V_{excite}$] on the slot elements. In an example, [$Z_{loaded}$] can be used to calculate the current around each slot using ohms law where [V] is a 1D array of applied voltages. In an example, 1V can be applied to the first element (representing a coaxial feed port) with all other voltages set to 0. That is:

$$[V_{excite}] = [I_{loaded}][Z_{loaded}]$$

Accordingly, [$I_{loaded}$] can then be used to calculate the voltage across a slot [$V_{slot}$] according to:

$$[V_{slot}] = [I_{loaded}][Z]$$

Where [Z] is the original (unloaded) impedance matrix. Using [$V_{slot}$], an array factor (AF) calculation can be performed to determine the antenna radiated pattern according to:

$$AF(\hat{r}) = \sum_{n=1}^{N} a_n e^{-jk\hat{r}\cdot\vec{r}_n}$$

Where N is an array of radiators located at $\vec{r}_n$. The $a_n$ are complex-valued excitation coefficients, and $\hat{r}$ is the direction unit vector.

Therefore, according to an example, S-Parameters of unloaded feed ports and the antenna radiated pattern can be calculated. An optimisation routine, such as a genetic algorithm for example, can be employed to optimise these variables. In an example, optimisation can aim to minimise the power reflected from the input port, and/or to minimise the power transmitted to a second unloaded coaxial port (the power lost is assumed to be radiated). Optimisation can aim to maximise power radiated in a given direction and also minimising the power radiated in all other directions. Other parameters relating to the antenna pattern could be included, such as axial ratio, cross polarisation and so on.

According to an example, an antenna pattern and s-parameters can be predicted with an initial estimate of the capacitances on the slot elements. Following this, an optimisation can be performed, as described above, and this can be repeated for a number of antenna beam pointing angles.

Accordingly, the machine can implement a method for generating a set of slot activation configurations for a holographic radial line slot antenna array comprising multiple slots defining a preconfigured slot pattern, each slot activation configuration defining a beam pattern for a signal to be emitted by the antenna.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer or software product, such as a non-transitory machine-readable storage medium, the computer software or product being stored in a storage medium and comprising a plurality of instructions, e.g., machine readable instructions, for making a computer device implement the methods recited in the examples of the present disclosure.

In some examples, some methods can be performed in a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 4:
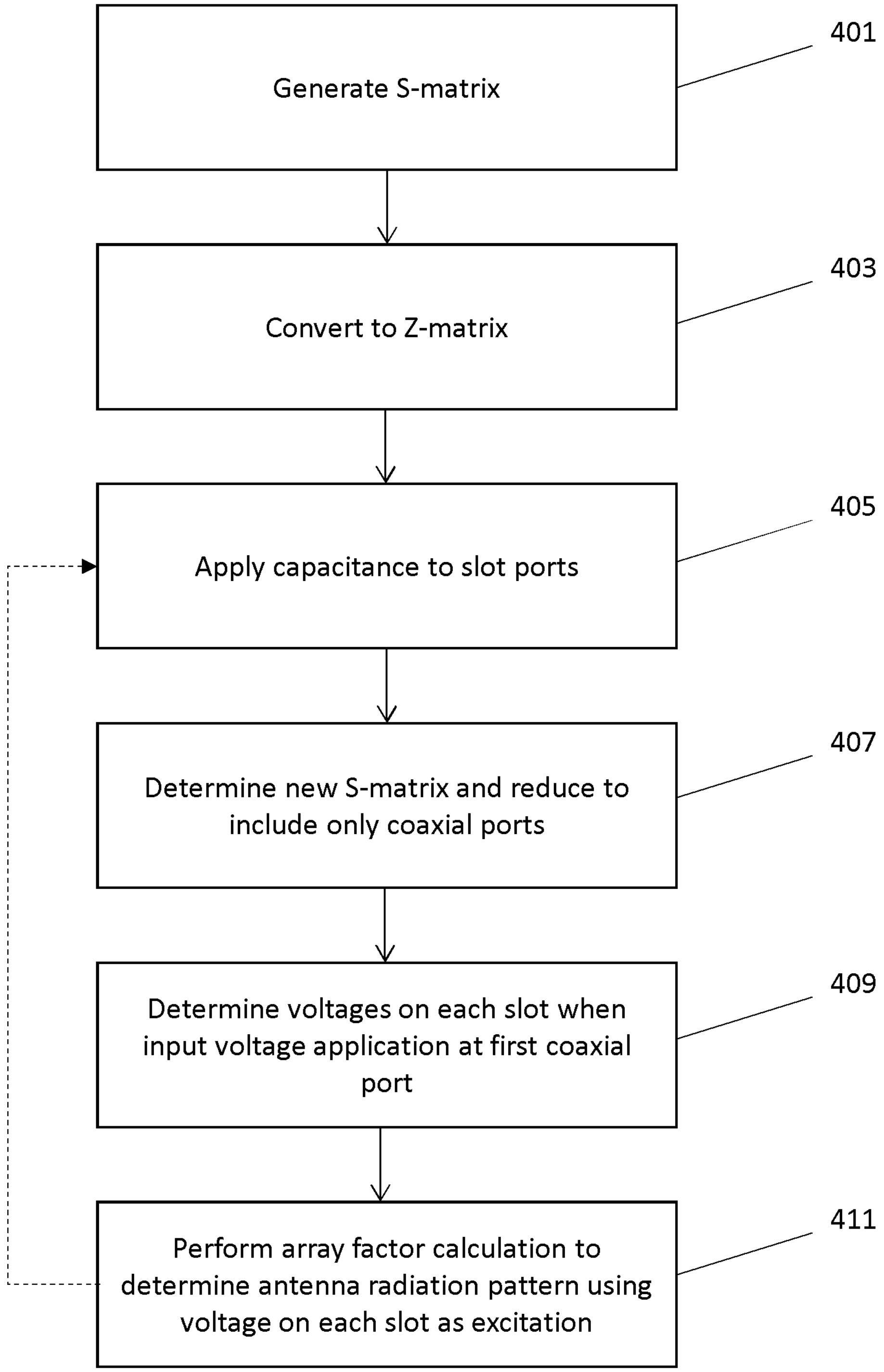
FIG. 4 is a flowchart of a method according to an example.

FIG. 4 is a schematic representation of a method according to an example. In block 401, for a given RLSA array geometry of interest, an s-matrix is generated as described above. In block 403, the S-matrix from block 401 for the array in question is converted to a Z-matrix, as described above, and in block 405 capacitances are applied to slot ports in order to tune the slots of the array. As described above, tuning can be geared such that a slot is operating at resonance, effectively off, or to some degree in between, depending on the value of capacitance applied. For a given beam pattern under investigation, a slot can therefore operate in any one of multiple regimes, thereby enabling complex beam patterns and beam steering to be provided. In block 407, a new S-matrix is determined, as described above, and reduced to include only coaxial ports. That is, in an example, the loaded Z-matrix can be converted back to an S-Parameter matrix to enable investigation as to what the S-parameters of the unloaded coaxial ports are. In block 409, voltages on each slot are determined when an input voltage is applied to the first coaxial port of the array (i.e., to the feed of the array). In an example, this input voltage can be 1V. In block 411, array factor calculations can be performed to determine the antenna radiation pattern using the voltage on each slot as the excitations.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. In addition, one or more of the modules described herein may transform data, physical devices, and/or representations of physical devices from one form to another.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The invention claimed is:

1. A method for generating a set of slot activation configurations for a holographic radial line slot antenna array comprising multiple slots defining a preconfigured slot pattern, each slot activation configuration defining a beam pattern for a signal to be emitted by the antenna array, the method comprising:

generating a measure for mutual coupling between the multiple slots in the presence of a signal to be applied to the antenna array, the measure comprising a set of scattering parameters defining a scattering matrix for the antenna array;

using the measure for the mutual coupling, generating a set of impedance parameters for the antenna array;

controlling a resonance of at least one of the multiple slots by regulating a value of capacitance of a variable capacitance device provided across the slot using one of multiple discrete values for capacitive reactance;

measuring a value for antenna gain of a beam pattern associated with the value of capacitance;

selecting a final value of capacitance resulting in the highest measure of gain for the beam pattern; and selecting a slot activation configuration for the beam pattern on the basis of the selected final value of capacitance.

2. The method of claim 1, comprising:

measuring a value for radiated power of the antenna array.

3. The method of claim 1, comprising:

measuring a value for power in a direction of peak gain for the antenna array.

4. The method of claim 1, comprising:

generating an updated measure for the mutual coupling between the multiple slots in the presence of the value of capacitance.

5. The method of claim 1, comprising:

determining the measure for the mutual coupling by calculating respective measures of current flowing through resistive elements logically disposed across ports of the multiple slots.

6. The method of claim 1, wherein regulating a value of capacitance of a variable capacitance device comprises adjusting respective values of reactive capacitance for the multiple slots.

7. The method of claim 1, comprising:

converting the set of impedance parameters for the antenna array to an updated measure for the mutual coupling between the slots in the presence of the value of capacitance.

8. The method of claim 7, comprising:

calculating respective measures for excitations of the multiple slots.

9. A non-transitory machine-readable storage medium encoded with instructions that when executed by one or more processors cause a process to be carried out for generating a set of slot activation configurations for a holographic radial line slot antenna array, the antenna array comprising multiple slots defining a preconfigured slot pattern, each slot activation configuration defining a beam pattern for a signal to be emitted by the antenna array, the process comprising:

generating an impedance matrix for the antenna array using a set of scattering parameters for the antenna array;

controlling a resonant frequency of at least one of the multiple slots by regulating a value of capacitance of a variable capacitance device provided across the slot using one of multiple discrete values for capacitive reactance, whereby to generate an updated impedance matrix for the antenna array;

calculating respective measures of current around the multiple slots using the updated impedance matrix;

calculating respective measures of voltage across the multiple slots using the measures of current and the impedance matrix;

converting the updated impedance matrix to an updated set of scattering parameters; and using the updated set of scattering parameters and the measures of voltage, calculating a radiation pattern for the antenna array.

10. The storage medium of claim 9, the process comprising:

optimizing the resonant frequency using multiple different combinations of capacitive reactance to minimize power reflected from an input port of the antenna array.

11. The storage medium of claim 9, the process comprising:

optimizing the resonant frequency using multiple different combinations of capacitive reactance to minimize power transmitted to an unloaded coaxial port of the antenna array.

12. The storage medium of claim 9, the process comprising:

optimizing the resonant frequency using multiple different combinations of capacitive reactance to maximize power radiated in a selected direction.

13. The storage medium of claim 9, the process comprising:

generating a set of slot activation configurations, each slot activation configuration defining a capacitive reactance for each of the multiple slots for a given beam pattern for the antenna array.

14. A non-transitory machine-readable storage medium encoded with instructions that when executed by one or more processors cause a process to be carried out for generating a set of slot activation configurations for a holographic radial line slot antenna array, the antenna array comprising multiple slots defining a preconfigured slot pattern, each slot activation configuration defining a beam pattern for a signal to be emitted by the antenna array, the process comprising:

using a measure for mutual coupling between the multiple slots, generating a set of impedance parameters for the antenna array, the measure for the mutual coupling generated in the presence of a signal applied to the antenna array and comprising a set of scattering parameters defining a scattering matrix for the antenna array;

controlling a resonance of at least one of the multiple slots by regulating a value of capacitance of a variable capacitance device provided across the slot using one of multiple discrete values for capacitive reactance;

measuring a value for antenna gain of a beam pattern associated with the value of capacitance;

selecting a final value of capacitance resulting in the highest measure of gain for the beam pattern; and selecting a slot activation configuration for the beam pattern on the basis of the selected final value of capacitance.

15. The storage medium of claim 14, the process comprising one or both of:

measuring a value for radiated power of the antenna array;

measuring a value for power in a direction of peak gain for the antenna array.

16. The storage medium of claim 14, the process comprising:

generating an updated measure for the mutual coupling between the multiple slots in the presence of the value of capacitance.

17. The storage medium of claim 14, the process comprising:

converting the set of impedance parameters for the antenna array to an updated measure for the mutual coupling between the slots in the presence of the value of capacitance.

18. The storage medium of claim 17, the process comprising:

calculating respective measures for excitations of the multiple slots.

* * * * *